United States Patent Office 3,223,698
Patented Dec. 14, 1965

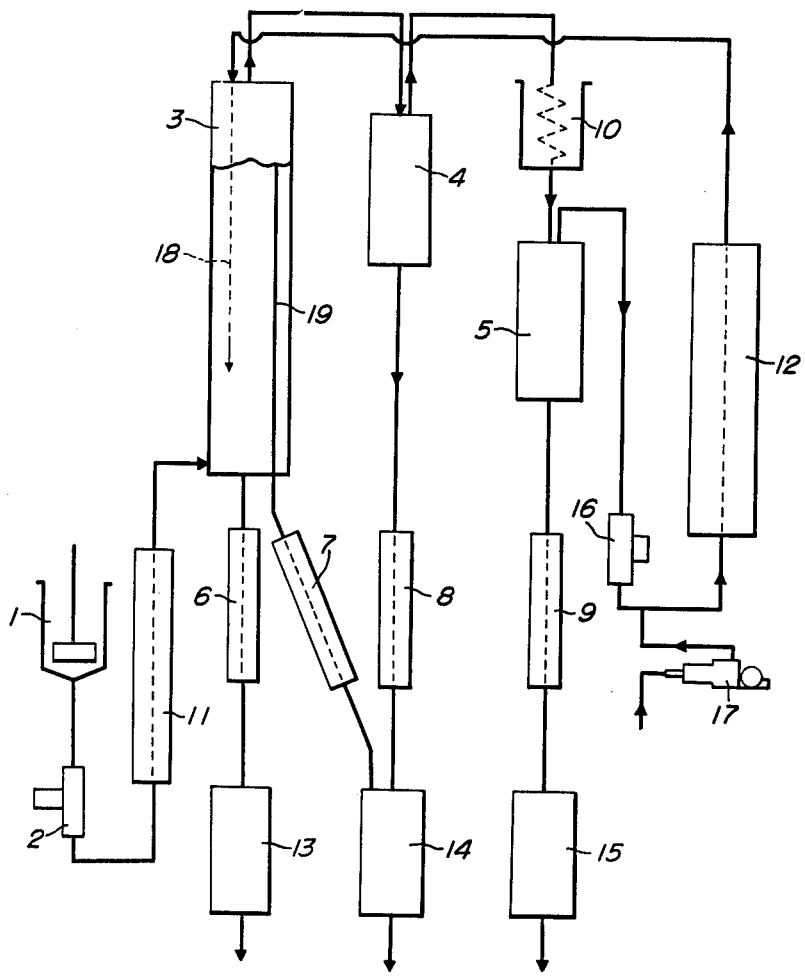

3,223,698
METHOD FOR LIQUEFYING LIGNIN
Motoyoshi Oshima, Yoshio Maeda, and Kan Kashima, all of Tokyo, Japan, assignors to The Noguchi Institute, Tokyo, Japan, an incorporated body of Japan
Filed May 29, 1961, Ser. No. 113,349
Claims priority, application Japan, Jan. 9, 1961, 36/374, 36/375
5 Claims. (Cl. 260—124)

The present invention is concerned with the method for liquefying lignin materials obtained by chemical treatments of wood materials. The lignin materials include basic lignin-sulfonates obtained from sulfite pulp waste liquors, thiolignin obtained from kraft pulp waste liquors, and bark lignin and acid lignin obtained from wood saccharification (by sulfuric acid method, hydrochloric acid method, or hydrogen chloride gas method).

Various kind of researches on liquefaction of lignin have been made heretofore. These researches were summarized by S. Brauns in "Chemistry of Lignin" (published at New York, U.S.A., in 1952).

In the researches of Karl Freudenberg et al. on the method for liquefying lignin, hydrogenation cracking of lignin was conducted in an alkaline solution with or without catalyst, wherein such reaction conditions as reaction temperature of higher than 300° C., hydrogen pressure of 140 atm., reaction period of 9 to 12 hours, were employed. The resulting reaction product was extracted with ether to yield 40.4% of ether extract.

Further, B. E. Brauns has mentioned in his writings that he made research on liquefaction of lignin using solvent with or without catalyst. In his book he describes that B. L. Moldavskill et al. got the highest yield in lignin liquefaction. According to the researches of B. L. Moldavskill et al., liquefaction of sulfuric acid lignin was conducted by use of a solvent, such as phenol, lignin tar, etc., and a catalyst, such as molybdenum sulfide, wherein such reaction conditions as initial hydrogen pressure of 50 to 70 atm. and reaction temperature of 400° to 450° C. were employed. The tarry material was obtained in 44% yield.

As seen from the above, methods of liquefaction of lignin material heretofore known, give, in general, lignin liquefaction ratio of as low as about 40%. And the period of time needed for liquefaction is 4–10 hours.

Liquefaction ratio as identified in this specification means a value obtained by deduction of the part of unreacted lignin from 100 parts of starting lignin.

The product yielded by the conventional method of liquefaction is a heavy oil or tarry material containing various complicated constituents, which are separated from each other with extreme difficulty. Besides, the catalyst employed in the conventional method of liquefaction is expensive, and the industrial method for recovery of such catalyst is exceedingly troublesome.

The reason why the process for liquefying lignin is not yet industrialized, would be due to the low liquefaction ratio and difficult recovery of the catalyst.

It is a primary object of the invention to provide a method for liquefying lignin by use of a low-priced catalyst within a much shorter period of time. It is another object of the invention to provide a mode of liquefaction, by which readily separable reaction products can be obtained, the latter serving as raw materials in organic synthetic chemistry. It is still another object to provide a mode for liquefying lignin material in hydrogen gas atmosphere. It is still another object to provide a method which can be worked continuously.

Further objects, advantages and features, will be apparent from the descriptions which follow.

The drawing attached is an illustrative figure of apparatus for liquefying lignin which is suitable for working of the method of the invention.

According to the present invention, lignin is admixed with a solvent, a catalyst of iron sulfide (FeS) or of iron-sulfur (Fe-S) type, and a co-catalyst for such catalyst, and the mixture is subjected to reaction in hydrogen atmosphere at a higher temperature and at a higher pressure.

The lignin material employed in the present invention includes ligninsulfonates contained in sulfite pulp waste liquor, thiolignin contained in kraft pulp waste liquor, acid lignin, bark lignin, and other lignin obtained as the residue in various modes of hydrolysis of woods, as described by F. E. Brauns in "Chemistry of Lignin," p. 49–126 (Academic Press Inc., publisher, New York, U.S.A., 1952).

The above-identified catalyst comprises the following:
(a) Catalyst composed of iron sulfide (FeS) and, as the co-catalyst, a sulfide of metal selected from the group consisting of copper, silver, tin, chromium, cobalt, nickel, zinc and molybdenum, or a mixture thereof;
(b) Catalyst containing, as the main catalyst component, a mixture of metallic iron or an iron compound containing no sulfur, such as iron oxides ($Fe_2O_3$, $Fe_3O_4$, and FeO), iron hydroxide ($Fe(OH)_3$) and/or other iron compounds ($FeCO_3$, $FeC_2O_4 \cdot 2H_2O$, $Fe_2(C_2O_4)_3$, and $(HCOO)_2Fe$), with sulfur, and, as the co-catalyst, a mixture of a metal, selected from the group consisting of copper, silver, tin, chromium, cobalt, nickel, zinc and molybdenum, or a compound of such metal containing no sulfur, such as oxide, hydroxide, carbonate, oxalate, and/formate of such metals, or a mixture thereof, with sulfur.

As above-mentioned, various combinations of the catalyst may be used, of which, however, a catalyst containing, as the main catalyst component, (1) iron sulfide, or (2) a mixture of metallic iron, iron oxide, or iron hydroxide, with sulfur (mol ratio of Fe:S being 1:1), and, as the co-catalyst, sulfide of a metal selected from the group as identified above, or a mixture of such metals, or oxide or hydroxide of such metals, with sulfur, is suitable from the industrial point of view.

Mol ratio of the main catalyst and the co-catalyst is selected so as to be Fe:Metal:S being 10:0.5:10.5 to 10:5:15, preferably 10:1:11. The amount of the catalyst to be employed is 0.3 to 50% (by weight), preferably 0.5 to 10%, based upon the lignin material.

The catalyst of the invention may preferably be used by mixing iron sulfide with a sulfide of the above-mentioned metals, or mixing an above-mentioned iron compound, a compound of the above-mentioned metals, and sulfur, to form a paste, and milling the mixture by means of a ball-mill.

There is no specific limitation in particle size of the catalyst. In general, those having a particle size of 100 microns to a few microns may be used. It is suitable to use the catalyst having as small particle size as possible, since such size permits to form excellent suspension in the paste.

In the present invention, the lignin material is used in a solvent. As such solvents, lignin tar, naphthene hydrocarbon (for example, tetralin), phenols, gas oil, creosote oil, a hydrogenated oil from coal, and water may be mentioned. The solvent may be used either in alone, or as a mixture of two or more of them.

If water is employed in alone as the solvent, the lignin material used is to be limited to a hydrophillic one, such as ligninsulfonate, rather than a hydrophobic lignin material.

The amount of the solvent to be used should be 50% to 500%, more preferably 100% to 200%, based upon the lignin material.

In the liquefaction of the lignin material, a mineral oil (for example, a paraffinic petroleum crude oil or a higher boiling hydrocarbon oil such as lubricating oil, which does not dissolve the lignin material) may be combined with said solvent.

The amount of the solvent to be combined, which dissolve lignin, is 10% to 50%, more preferably 20% to 40%.

The reaction temperature somewhat varies, depending upon the characteristics of the catalysts employed. In the industrial process, suitable reaction temperature is 350° to 400°.

In practising the method of the present invention, a sufficiently higher pressure (for example, at least 150 atm. and at most 300 atm.) to keep a major part of the solvent for the lignin material and of the reaction product in liquid phase at a reaction temperature, is to be held.

Hence, the reaction in the present invention is preferably effected at 150 to 450 atm. and at 250° C. to 450° C.

The reaction should be continued until a substantial part of the lignin material is liquefied. The period varies depending upon the kind of the starting material and the reaction temperature, and is generally 0.5 to 3 hours, more preferably 1 to 2 hours. It is a remarkable characteristic that the reaction of the method of the present invention is finished within 1 to 2 hours, compared with that the conventional hydrogenation reaction of lignin needs 4–10 hours.

In the method of the present invention, hydrogen gas is used as the source of hydrogen.

The reaction mechanism, according to which the process of the invention proceeds, is not yet obvious now, but it is presumed that the ether-bond in the lignin material is, first, cleaved, and, thence, deoxygenation reaction proceeds by action of said catalyst containing iron sulfide as the main catalyst, and/or said catalyst which is formed in the course of the liquefaction reaction.

It should be noted that the components of the liquefied product obtained by the present method differ from that obtained by the heretofore known methods.

The liquefied product obtained in the present invention is composed of two layers, namely, oily and aqueous layers.

It is extremely notable features thaat the liquefied product of the invention comprises comparatively simpler components, as compared with the conventional methods give a tarry product.

Of the product obtained by the method of the invention, the aqueous layer essentially yields acetone and methanol, and the oily layer yields essentially monophenols, catechols, and a heavy oil.

By suitable selection of the kind of the catalyst and the reaction conditions, a hydrocarbon (aromatic hydrocarbon) can be obtained.

When a metallic compound other than copper, namely a compound of nickel, tin or ethers, is used as the co-catalyst, hydrocarbons are produced. And the produced amount of aromatic hydrocarbon tends to increase with raised reaction temperature. While a copper compound tends to prohibit production of hydrocarbons.

As the monophenols, o-cresol, p-cresol, (m-cresol being not formed), o-ethylphenol, p-ethylphenol, propylphenol, etc. are involved. As the catechols, pyrocatechol and alkylcatechols are involved.

As the neutral oil, aromatic hydrocarbons, such as m-xylene, ethylbenzene, p-xylene, propylbenzene, etc. are involved.

These products can easily be separated from each other by distillation and extraction. Each component separated is useful as raw material for organic synthetic chemistry.

The present invention will be more fully described with respect to the following examples, in which parts are by weight unless otherwise provided.

*Example 1*

One hundred parts of lignin obtained as the residue in wood saccharification with hydrogen chloride gas process, is admixed with 200 parts of lignin tar (a fraction boiling at above 260° C.) and 10 parts of a mixed catalyst consisting of FeS and CuS (mol ratio of Fe:Cu being 10:1). The mixture is kneaded to form a paste, and charged in an autoclave. The reaction is effected at hydrogen pressure of 60 atm. and at reaction temperature of 360° to 370° C. under reaction pressure of 200 atm. for reaction period of 2.0 hours, with the liquefaction ratio reaching 92.1%. The liquefied product is comprised of 7.0 parts of a fraction boiling at below 100° C. (containing acetone, methanol, etc.), 49 parts of a fraction boiling at 190 to 230° C. (the monophenol fraction, containing o-cresol, p-cresol, o-ethylphenol, p-ethylphenol, n-propylphenol, etc.), 4.5 parts of a fraction boiling at 230° to 260° C. (the catechol fraction, containing pyrocatechol, etc.), and 15.6 parts of a fraction boiling at above 260° C., based upon 100 parts of lignin.

*Example 2*

One hundred parts of lignin obtained as the residue in wood saccharification with hydrochloric acid (see F. E. Brauns; Chemistry of Lignin, page 56, 1952) is admixed with 200 parts of lignin tar (a fraction boiling at above 260° C.) and 10 parts of a mixed catalyst consisting of FeS and CuS (mol ratio of Fe:Cu being 10:1, 20:1). The mixture is kneaded to form a paste, and charged in an autoclave. The reaction is effected at hydrogen pressure of 60 atm. and at reaction temperature of 360° to 370° C. under reaction pressure of 200 atm. for reaction period of 2.0 hours, with the liquefaction ratio reaching 90.8%. The liquefied product is comprised of 6.7 parts of a fraction boiling at below 100° C. (containing acetone, methanol, etc.), 44 parts of a fraction boiling at 190° to 230° C. (the monophenol fraction, containing o-cresol, p-cresol, o-ethylphenol, p-ethylphenol, n-propylphenol, etc.), 4.0 parts of a fraction boiling at 230° to 260° C. (the catechol fraction, containing pyrocatechol, etc.), and 18 parts of a fraction boiling at above 260° C., based upon 100 parts of lignin.

*Example 3*

One hundred parts of lignin obtained as the residue in wood saccharification with sulfuric acid (see F. E. Brauns; Chemistry of Lignin, page 56, 1952), is admixed with 200 parts of lignin tar (a fraction boiling at above 260° C.) and 10 parts of a mixed catalyst consisting of FeS and CuS (mol ratio of Fe:Cu being 10:1). The mixture is kneaded to form a paste, and charged in an autoclave. The reaction is effected at hydrogen pressure of 60 atm. and at reaction temperature 360° to 370° C. under reaction pressure of 196 atm. for reaction period of 2.0 hours, with the liquefaction ratio reaching 87.6%. The liquefied product is comprised of 4.5 parts of a fraction boiling at below 100° C. (containing acetone, methanol, etc.), 38 parts of a fraction boiling at 190° to 230° C. (the monophenol fraction, containing o-cresol, p-cresol, o-ethylphenol, p-ethylphenol, n-propylphenol, etc.), 3.5 parts of a fraction boiling at 230° to 260° C. (the catechol fraction, containing pyrocatechol, etc.), and 20 parts of a fraction boiling at above 260° C., based upon 100 parts of lignin.

*Example 4*

One hundred parts of lignin, which is obtained from a salt of ligninsulfonic acid contained in a sulfite pulp waste liquor through desulfonation by heating at 180° to 190° C. for one hour with slaked lime, is admixed with 200 parts of lignin tar (a fraction boiling at above 260° C.) and 10 parts of a mixed catalyst consisting of FeS and CuS (mol ratio of Fe:Cu being 10:1). The mixture is kneaded to form a paste, and charged in an autoclave. The reaction is effected at hydrogen pressure of 60 atm. and at reaction temperature of 360° to 370° C. under reaction pressure of 206 atm. for reaction period of 2.0 hours, with the liquefaction ratio reaching 93.8%. The liquefied product is comprised of 7.3 parts of a fraction boiling at below 100° C. (containing acetone, methanol, etc.), 50.1 parts of a fraction boiling at 190° to 230° C. (the monophenol fraction, containing o-cresol, p-cresol, o-ethylphenol, p-ethylphenol, n-propylphenol, etc.), 5.0 parts of a fraction boiling at 230° to 260° C. (the catechol fraction, containing pyrocatechol, etc.), and 14.1 parts of a fraction boiling at above 260° C., based upon 100 parts of lignin.

*Example 5*

One hundred parts of thiolignin (calculated as pure lignin) obtained by precipitation through neutralization of a kraft pulp waste liquor with sulfuric acid, (see F. E. Brauns; Chemistry of Lignin, page 105), is admixed with 200 parts of lignin tar (a fraction boiling at above 260° C.) and 10 parts of a mixed catalyst consisting of FeS and CuS (mol ratio of Fe:Cu being 10:1). The mixture is kneaded to form a paste, and charged in an autoclave. The reaction is effected at hydrogen pressure of 60 atm. and at reaction temperature of 360° to 370° C. under reaction pressure of 200 atm. for reaction period of 2.0 hours, with the liquefaction ratio reaching 88.0%. The liquefied product is comprised of 4.8 parts of a fraction boiling at below 100° C. (containing acetone, methanol, etc.), 40 parts of a fraction boiling at 190° to 230° C. (the monophenol fraction, containing o-cresol, p-cresol, o-ethylphenol, p-ethylphenol, n-propylphenol, etc.), 3.8 parts of a fraction boiling at 230° to 260° C. (the catechol fraction, containing pyrocatechol, etc.), and 19 parts of a fraction boiling at above 260° C., based upon 100 parts of lignin.

*Example 6*

One hundred parts of bark lignin (calculated as pure lignin) is admixed with 200 parts of lignin tar (a fraction boiling at above 260° C.) and 10 parts of a mixed catalyst consisting of FeS and CuS (mol ratio of Fe:Cu being 10:1). The mixture is kneaded to form a paste, and charged in an autoclave. The reaction is effected at hydrogen pressure of 60 atm. and at reaction temperature of 370° to 380° C. under reaction pressure of 210 atm. for reaction period of 2.0 hours, with the liquefaction ratio reaching 85.4%. The liquefied product is comprised of 3.6 parts of a fraction boiling at below 100° C. (containing acetone, methanol, etc.), 35 parts of a fraction boiling at 190° to 230° C. (the monophenol fraction, containing o-cresol, p-cresol, o-ethylphenol, p-ethylphenol, n-propylphenol, etc.), 3.0 parts of a fraction boiling at 230° to 260° C. (the catechol fraction, containing pyrocatechol, etc.), and 26 parts of a fraction boiling at above 260° C., based upon 100 parts of lignin.

*Example 7*

One hundred parts of lignin (calculated as pure lignin), which is obtained from a sulfite pulp waste liquor by heating with slaked lime at 180° to 190° C. for 1 hour, is admixed with 200 parts of lignin tar (a fraction boiling at above 260° C.) and 10 parts of a mixed catalyst consisting of $Fe_2O_3$, and CuO and S (mol ratio of Fe:Cu:S being 20:1:21). The mixture is kneaded to form a paste, and charged in an autoclave. The reaction is effected at hydrogen pressure of 60 atm. and at reaction temperature of 360° to 370° C. under reaction pressure of 200 atm. for reaction period of 2.0 hours, with the liquefaction ratio reaching 93.5%. The liquefied product is comprised of 8.5 parts of a fraction boiling at below 100° C. (containing acetone, methanol, methyl ethyl ketone, etc.), 46.7 parts of a fraction boiling at 190° to 230° C. (the monophenol fraction, containing o-cresol, p-cresol, o-ethylphenol, p-ethylphenol, n-propylphenol, etc.), 5.8 parts of a fraction boiling at 230° to 260° C. (the catechol fraction, containing pyrocatechol, etc.), and 17.4 parts of a fraction boiling at above 260° C., based upon 100 parts of lignin.

*Example 8*

One hundred parts of lignin (as pure lignin) obtained from wood saccharification with hydrochloric acid as described in Example 2, is admixed with 200 parts of lignin tar (a fraction boiling at above 260° C.) and 10 parts of a mixed catalyst consisting of $Fe(OH)_3$, $Cu(OH)_2$ and S (mol ratio of Fe:Cu:S being 10:1:11). The mixture is kneaded to form a paste, and charged in an autoclave. The reaction is effected at hydrogen pressure of 60 atm. and at reaction temperature of 360° to 370° C. under reaction pressure of 200 atm. for reaction period of 1.5 hours, with the liquefaction ratio reaching 85.2%. The liquefied product is comprised of 7.1 parts of a fraction boiling at below 100° C. (containing acetone, methanol, methyl ethyl ketone, etc.), 42.3 parts of a fraction boiling at 190° to 230° C. (the monophenol fraction), 5.6 parts of a fraction boiling at 230° to 260° C. (the catechol fraction), and 15.2 parts of a fraction boiling at above 260° C,. based upon 100 parts of lignin.

The monophenol fraction comprises 9.5 parts of o-cresol, 25.5 parts of p-cresol, 5.0 parts of p-ethylphenol, and 2.3 parts of 4-propylphenol.

The catechol fraction comprises mainly pyrocatechol, and contains also a minor amount of methylcatechol and ethylcatechol.

*Example 9*

One hundred parts of lignin (as pure lignin) obtained from wood saccharification with sulfuric acid as described in Example 3, is admixed with 200 parts of lignin tar (a fraction boiling at above 260° C.) and 10 parts of a mixed catalyst consisting of $Fe(OH)_3$, $Cu(OH)_2$ and S (mol ratio of Fe:Cu:S being 20:1:21). The mixture is kneaded to form a paste, and charged in an autoclave. The reaction is effected at hydrogen pressure of 60 atm. and at reaction temperature of 360° to 370° C. under reaction pressure of 200 atm. for reaction period of 1.5 hours, with the liquefaction ratio reaching 95.3%. The liquefied product is comprised of 9.6 parts of a fraction boiling at below 100° C. (containing acetone, methanol, methyl ethyl ketone, etc.), 45.7 parts of a fraction boiling at 190° to 230° C. (the monophenol fraction, containing o-cresol, p-cresol, o-ethylphenol, p-ethylphenol, n-propylphenol, etc.), 3 parts of a fraction boiling at 230° to 260° C. (the catechol fraction, containing pyrocatechol, etc.), and 22 parts of a fraction boiling at above 260° C., based upon 100 parts of lignin.

*Example 10*

One hundred parts of lignin (as pure lignin) obtained from wood saccharification with hydrogen chloride gas as described in Example 1, is admixed with 200 parts of petroleum crude oil containing 20% of lignin tar (a fraction boiling at above 260° C.) and 10 parts of a mixed catalyst consisting of $Fe(OH)_3$, $Cu(OH)_2$ and S (mol ratio of Fe:Cu:S being 10:1:11). The mixture is kneaded to form a paste, and charged in an autoclave. The reaction is effected at hydrogen pressure of 60 atm. and at reaction temperature of 360° to 370° C. under reaction pressure of 200 atm. for reaction period of 1.5 hours, with the liquefaction ratio reaching 94.8%. The liquefied product is comprised of 7.2 parts of a fraction boiling at below 100° C. (containing acetone, methanol, methyl ethyl ketone, etc.), 45.8 parts of a fraction boiling at 190° to 230° C. (the monophenol fraction, containing c-cresol, p-cresol, o-ethylphenol, p-ethylphenol, n-propylphenol, etc.), 16.0 parts of a fraction boiling at 230° to 260° C. (the catechol fraction, containing pyrocatechol, etc.), and 20.8 parts of a fraction boiling at above 260° C., based upon 100 parts of lignin.

Example 11

To 1000 parts of a liquor, obtained from a sulfite pulp waste liquor through removal of sugar and calcium sulfite by a fractional precipitation with slaked lime, and containing 200 parts of lignin, is added 20 parts of catalyst containing 1 part of FeS and 0.05 part of copper oxide. The reaction is effected at initial hydrogen pressure of 60 atm. and at reaction temperature of 320° and 330° C. under reaction pressure of 220 atm. for 2.0 hours, with the liquefaction ratio of 88.2%. J The liquefied product is separated to aqueous and oily layers. The former is extracted with benzene, and the residual oil after distilling off benzene, together with the latter oily layer, is distilled. The liquefied product is comprised of 5 parts of acetone and methanol, 32.7 parts of monophenols, such as o-cresol, p-cresol, p-ethylphenol, 4-propylphenol, etc., 10.5 parts of catechols, such as pyrocatechol, 4-methylcatechol, 4-ethylcatechol, etc., and 25 parts of a higher boiling oil, based upon 100 parts of lignin.

Example 12

To 100 parts of bark lignin, are added 150 parts of lignin tar (a fraction boiling at above 260° C.) and 5 parts of a mixed catalyst consitsing of $Fe(OH)_3$, CuS and S (mol ratio of Fe:Cu:S being 20:1:21), and the mixture is kneaded to form a paste. Then, the reaction is effected in hydrogen atmosphere at reaction temperature of 370° to 380° C. under reaction pressure of 200 to 210 atm. for 120 min., with the liquefaction ratio of 81%. From the liquefied product, 7.2 parts of acetone and methanol, 25 parts of monophenols (such as o-cresol, p-cresol, 4-ethylphenol, etc.) and catechols (such as pyrocatechol, 4-methylcatechol, 4-ethylcatechol, etc.), and 30 parts of a higher boiling oil (a fraction boiling at above 260° C.), are obtained.

Example 13

To a lignin material, containing 100 parts of lignin obtained from wood saccharification with hydrogen chloride gas as described in Example 1, are added 150 parts of lignin tar (a fraction boiling at above 250° C.) and 5 parts of a mixed catalyst consisting of Fe, Cu and S (mol ratio of Fe:Cu:S being 10:1:11), and the mixture is kneaded to form a paste. Then the reaction is effected at reaction temperature of 370° to 380° C. under reaction pressure of 200 to 210 atm. for 130 min., with the liquefaction ratio of 84%. From the liquefied product, 7 parts of acetone and methanol, 37 parts of monophenols (such as o-cresol, p-cresol, 4-ethylphenol, etc.) and catechols (such as pyrocatechol, etc.), and 25 parts of a higher boiling oil (a fraction boiling at above 260° C.), are obtained.

Example 14

To a lignin material, containing 100 parts of lignin obtained from a salt of ligninsulfonic acid contained in a sulfite pulp waste liquor through desulfonation as described in Example 4, are added 150 parts of lignin tar (a fraction boiling at above 260° C.) and 10 parts of a mixed catalyst consisting of $Fe_2O_3$, CuO, $SnO_2$ and S (mol ratio of Fe:Cu:Sn:S being 10:0.5:0.5:11), and the mixture is kneaded to form a paste. Then, the reaction is effected at reaction temperature of 370° to 380° C. under reaction pressure of 200 to 210 atm. for 120 min., with the liquefaction ratio of 85%. From the liquefied product, 8 parts of acetone and methanol, 34 parts of monophenols (such as o-cresol, p-cresol, 4-ethylphenol, etc.) and catechols (such as pyrocatechol) 4-methylcatechol, 4-ethylcatechol, etc.), and 30 parts of a higher boiling oil (a fraction boiling at above 260° C.), are obtained.

Example 15

One hundred parts of thiolignin as described in Example 5, is admixed with 200 parts of lignin tar (a fraction boiling at above 260° C.) and 7 parts of a mixed catalyst consisting of $Fe_2O_3$, $Sn(OH)_2$ and S (mol ratio of Fe:Sn:S being 20:1:21). The mixture is kneaded to form a paste, and charged in an autoclave. The reaction is effected at hydrogen pressure of 60 atm. and at reaction temperature of 360° to 370° C. under reaction pressure of 210 atm. for reaction period of 2 hours, with the liquefaction ratio reaching 86.2%. The liquefied product is comprised of 5.8 parts of a fraction boiling at below 100° C. (containing acetone, methanol, etc.), 23 parts of a fraction boiling at 190° to 230° C. (the monophenol fraction, containing o-cresol, p-cresol, o-ethylphenol, p-ethylphenol, n-propylphenol, etc.) and a fraction boiling at 230° to 260° C. (the catechol fraction, containing pyrocatechol, etc.), and 18 parts of a fraction boiling at above 260° C., based upon 100 parts of lignin.

Example 16

One hundred parts of lignin obtained from a sulfite pulp waste liquor as described in Example 4, in admixed with 200 parts petroleum crude oil containing 10% of lignin tar (a fraction boiling at above 260° C.) and 10 parts of a mixed catalyst consisting of $Fe(OH)_2$, $SnO_2$ and S (mol ratio of Fe:Sn:S being 20:1:21). The mixture is kneaded to form a paste, and charged in an autoclave. The reaction is effected at hydrogen pressure of 60 atm. and at reaction temperature of 360° to 370° C. under reaction pressure of 208 atm. for reaction period of 2 hours, with the liquefaction ratio reaching 82.1%. The liquefied product is comprised of 6.0 parts of a fraction boiling at below 100° C. (containing acetone, methanol, etc.), 20 parts of a fraction boiling at 190° to 230° C. (the monophenol fraction, containing o-cresol, p-cresol, o-ethylphenol, n-propylphenol, etc.) and a fraction boiling at 230° to 260° C. (the catechol fraction, containing pyrocatechol, etc.), and 19 parts of a fraction boiling at above 260° C., based upon 100 parts of lignin.

Example 17

To 100 parts of thiolignin, are added 150 parts of lignin tar (a fraction boiling at above 260° C.) and 10 parts of a mixed catalyst consisting of FeS and SnS (mol ratio of Fe:Sn being 20:1), and the mixture is kneaded to form a paste. Then, the reaction is effected in hydrogen atmosphere at reaction temperature of 370° to 380° C. under reaction pressure of 200 to 210 atm. for 120 min., with the liquefaction ratio of 77.7%, from the liquefied product, 5.7 parts of acetone and methanol, 18 parts of monophenols (such as o-cresol, p-cresol, 4-ethylphenol, etc.) and catechols (such as pyrocatechol, 4-methylcatechol, 4-ethylcatechol, etc.), 15 parts of a neutral oil, and 20 parts of a higher boiling oil (a fraction boiling at above 260° C.), are obtained.

Example 18

To 100 parts of lignin obtained from a sulfite pulp waste liquor as described in Example 4, are added 150 parts of lignin tar (a fraction boiling at above 260° C.) and 7 parts of a mixed catalyst consisting of $Fe_2O_3$, $SnO_2$ and S (mol ratio of Fe:Sn:S being 20:1:21), and the mixture is kneaded to form a paste and fed into an autoclave. Then, the reaction is effected at initial hydrogen pressure of 60 atm. and at reaction temperature of 370 to 380° C. under reaction pressure of 200 to 210 atm. for 120 min., with the liquefaction ratio of 79%. From the liquefied product, 7.2 parts of acetone and methanol, 20 parts of monophenols (such as o-cresol, p-cresol, 4-ethylphenol, etc.) and catechols (such as pyrocatechol, 4-methylcatechol, 4-ethylcatechol, etc.), 12 parts of a neutral oil, and 25 parts of a higher boiling oil (a fraction boiling at above 260° C.), are obtained.

Example 19

To 100 parts of lignin obtained from a sulfite pulp waste liquor, are added 150 parts of a petroleum crude oil containing 20% of lignin tar (a fraction boiling at above 260° C.) and 10 parts of a mixed catalyst consisting of Fe(OH)$_3$, Sn(OH)$_2$ and S (mol ratio of Fe:Sn:S being 20:1:21), and the mixture is kneaded to form a paste. Then, the reaction is effected in hydrogen atmosphere at reaction temperature of 370° to 380° C. under reaction pressure of 200 to 210 atm. for 120 min., with the liquefaction ratio of 83%. From the liquefied product, 6 parts of acetone and methanol, 23 parts of monophenols (such as o-cresol, p-cresol, 4-ethylphenol, etc.) and catechols (such as pyrocatechol, 4-methylcatechol, 4-ethylcatechol, etc.), 19 parts of a neutral oil, and 20 parts of a higher boiling oil (a fraction boiling at above 260° C.), are obtained.

*Example 20*

To 100 parts of bark lignin, are added 150 parts of lignin tar (a fraction boiling at above 260° C.) and 8 parts of a mixed catalyst consisting of Fe$_3$O$_4$, SnO and S (mol ratio of Fe:Sn:S being 20:1:21), and the mixture is kneaded to form a paste and fed into an autoclave. Then, the reaction is effected at initial hydrogen pressure of 60 atm. and at reaction temperature of 360° to 370° C. under reaction pressure of 200 to 210 atm. for 120 min., with the liquefaction ratio of 71%. From the liquefied product, 5 parts of acetone, methanol, and methyl ethyl ketone, 17 parts of monophenols (such as o-cresol, p-cresol, 4-ethylphenol, etc.) and catechols (such as pyrocatechol, 4-methylcatechol, etc.), 13 parts of a neutral oil, and 18 parts of a higher boiling oil (a fraction boiling at above 260° C.), based upon 100 parts of lignin, are obtained.

*Example 21*

To 100 parts of lignin (as a pure lignin) obtained from a salt of ligninsulfonic acid contained in a sulfite pulp waste liquor through desulfonation as described in Example 4, are added 150 parts of lignin tar (a fraction boiling at above 260° C.) and 10 parts of a mixed catalyst consisting of FeS, CuS and SnS (mol ratio of Fe:Cu:Sn being 20:1:1), and the mixture is kneaded to form a paste and fed into an autoclave. Then, the reaction is effected at initial hydrogen pressure of 60 atm. and at reaction temperature of 370° to 380° C. under reaction pressure of 200 to 210 atm. for 120 min., with the liquefaction ratio of 89.2%. From the liquefied product, 5.1 parts of acetone and methanol, 19 parts of monophenols (such as o-cresol, p-cresol, 4-ethylphenol, etc.) and catechols (such as pyrocatechol, 4-methylcatechol, 4-ethylcatechol, etc.), 25 parts of a neutral oil, and 20 parts of a higher boiling oil (a fraction boiling at above 260° C.), are obtained.

*Example 22*

To 100 parts of lignin obtained as the residue in wood saccharification with sulfuric acid as described in Example 3, are added 150 parts of lignin tar (a fraction boiling at above 260° C.) and 7 parts of a mixed catalyst consisting of Fe(OH)$_3$, Cu(OH)$_2$, Sn(OH)$_2$, and S (mol ratio of Fe:Cu:Sn:S being 20:0.5:0.5:21), and the mixture is kneaded to form a paste. Then, the reaction is effected in hydrogen atmosphere at reaction temperature of 370° to 380° C. under reaction pressure of 200 to 210 atm. for 1.5 hours, with the liquefaction ratio of 88%. From the liquefied product, 7 parts of acetone and methanol, 45 parts of monophenols (such as o-cresol, p-cresol, 4-ethylphenol, etc.) and catechols (such as pyrocatechol, 4-methylcatechol, 4-ethylcatechol, etc.), and 23 parts of a higher boiling oil (a fraction boiling at above 260° C.), are obtained.

*Example 23*

To 100 parts of lignin obtained from sulfate pulp waste liquor as described in Example 4, are added 150 parts of lignin tar (a fraction boiling at above 260° C.) and 20 parts of a mixed catalyst consisting of Fe, Cu, Sn, and S (mol ratio of Fe:Cu:Sn:S being 20:0.5:0.5:21), and the mixture is kneaded to form a paste. Then, the reaction is effected in hydrogen atmosphere at reaction temperature of 360° to 370° C. under reaction pressure of 200 to 210 atm. for 120 min., with the liquefaction ratio of 90%. From the liquefied product, 48 parts of acetone and methanol, 48 parts of monophenols (such as o-cresol, p-cresol, 4-ethylphenol, etc.) and catechols (such as pyrocatechol, 4-methylcatechol, 4-ethylcatechol, etc.), and 21 parts of a higher boiling oil (a fraction boiling at above 260° C.), are obtained.

*Example 24*

To 100 parts of lignin obtained from a sulfite pulp waste liquor as described in Example 4, are added 150 parts of lignin tar (a fraction boiling at above 260° C.) and 10 parts of a mixed catalyst consisting of FeS and AgS (mol ratio of Fe:Ag being 20:1), and the mixture is kneaded to form a paste. Then, the reaction is effected in hydrogen atmosphere at reaction temperature of 360° to 370° C. under reaction pressure of 200 to 210 atm. for 120 min., with the liquefaction ratio of 92%. From the liquefied product, 7 parts of acetone and methanol, 18 parts of monophenols (such as o-cresol, p-cresol, 4-ethylphenol, etc.) and catechols (such as pyrocatechol, 4-methylcatechol, 4-ethylcatechol, etc.) 27 parts of a neutral oil, and 30 parts of a higher boiling oil (a fraction boiling at above 260° C.), are obtained.

*Example 25*

One hundred parts of lignin material (obtained from a sulfite pulp waste liquor) is admixed with 200 parts of lignin tar (a fraction boiling at above 260° C.) and 10 parts of a mixed catalyst consisting of Fe(OH)$_3$, AgO and S (mol ratio of Fe:Ag:S being 10:1:11). The mixture is kneaded to form a paste, and charged in an autoclave. The reaction is effected at hydrogen pressure of 60 atm. and at reaction temperature of 360° to 370° C. under reaction pressure of 200 atm. for reaction period of 2.5 hours, with the liquefaction ratio reaching 87%. The liquefied product is comprised of 6 parts of a fraction boiling at below 100° C. (containing acetone, methanol, etc.), 15 parts of a fraction boiling at 190° to 230° C. (the monophenol fraction, containing o-cresol, p-cresol, o-ethylphenol, p-ethylphenol, n-propylphenol, etc.), 30 parts of a fraction boiling at 230° to 260° C. (the catechol fraction, containing pyrocatechol, etc.), and 30 parts of a fraction boiling at above 260° C., based upon 100 parts of lignin.

*Example 26*

To 100 parts of lignin (as a pure lignin) obtained from a sulfite pulp waste liquor as described in Example 4, are added 150 parts of lignin tar (a fraction boiling at above 260° C.) and 10 parts of a mixed catalyst consisting of FeS and NiS (mol ratio of Fe:Ni being 20:1), and the mixture is kneaded to form a paste. Then, the reaction is effected in hydrogen atmosphere at reaction temperature of 370° to 380° C. under reaction pressure of 210 atm. for 90 min., with the liquefaction ratio of 86%. From the liquefied product, 7.7 parts of acetone and methanol, 19 parts of monophenols (such as o-cresol, p-cresol, 4-ethylphenol, etc.) and catechols (such as pyrocatechol, 4-methylcatechol, 4-ethylcatechol, etc.), 10 parts of a neutral oil, and 28 parts of a higher boiling oil (a fraction boiling at above 260° C.), are obtained.

*Example 27*

To 100 parts of bark lignin (calculated as pure lignin) are added 150 parts of naphthene petroleum crude oil containing 20% of lignin tar (a fraction boiling at above 260° C.) and 5 parts of a mixed catalyst consisting of Fe(OH)$_2$, Ni(OH)$_3$, and S (mol ratio of Fe:Ni:S being 20:1:21), and the mixture is kneaded to form a paste. Then, the reaction is effected in hydrogen atmosphere at reaction temperature of 370° to 380° C. under reaction pressure of 200 to 210 atm. for 120 min., with the liquefaction ratio of 87%. From the liquefied product, 7.5 parts of acetone and methanol, 26 parts of monophenols (such as o-cresol, p-cresol, 4-ethylphenol, etc.) and catechols (such as pyrocatechol, 4-methylcatechol, 4-ethylcatechol, etc.), 8 parts of a neutral oil, and 26 parts of a higher boiling oil (a fraction boiling at above 260° C.), are obtained.

*Example 28*

One hundred parts of lignin obtained from sulfite waste liquor as described in Example 4 is admixed with 200 parts of lignin tar (a fraction boiling at above 260° C.) and 5 parts of a mixed catalyst consisting of $Fe_2O_3$, $Ni(OH)_2$ and S (mol ratio of Fe:Ni:S being 20:1:21). The mixture is kneaded to form a paste, and charged in an autoclave. The reaction is effected at hydrogen pressure of 60 atm. and at reaction temperature of 360° to 370° C. under reaction pressure of 216 atm. for reaction period of 2 hours, with the liquefaction ratio reaching 87%. The liquefied product is comprised of 7.1 parts of a fraction boiling at below 100° C. (containing acetone, methanol, etc.), 21 parts of a fraction boiling at 190° to 230° C. (the monophenol fraction, containing o-cresol, p-cresol, o-ethylphenol, p-ethylphenol, n-propylphenol, etc.) and a fraction boiling at 230° to 260° C. (the catechol fraction, containing pyrocatechol, etc.), and 20 parts of a fraction boiling at above 260° C., based upon 100 parts of lignin.

*Example 29*

One hundred parts of thiolignin obtained from kraft pulp waste liquor as described in Example 5 is admixed with 200 parts of lignin tar (a fraction boiling at above 260° C.) and 10 parts of a mixed catalyst consisting of Fe, Ni and S (mol ratio of Fe:Ni:S being 20:1:21). The mixture is kneaded to form a paste, and charged in an autoclave. The reaction is effected at hydrogen pressure of 60 atm. and at reaction temperature of 360° to 370° C. under reaction pressure of 200 atm. for reaction period of 2 hours, with the liquefaction ratio reaching 80.6%. The liquefied product is comprised of 7.6 parts of a fraction boiling at below 100° C. (containing acetone, methanol, etc.), 20 parts of a fraction boiling at 190° to 230° C. (the monophenol fraction, containing o-cresol, p-cresol, o-ethylphenol, p-ethylphenol, n-propylphenol, etc.) and a fraction boiling at 230° to 260° C. (the catechol fraction, containing pyrocatechol, etc.), and 16 parts of a fraction boiling at above 260° C., based upon 100 parts of lignin.

*Example 30*

To 100 parts of thiolignin obtained from kraft pulp waste liquor as described in Example 5, are added 150 parts of lignin tar (a fraction boiling at above 260° C.) and 5 parts of a mixed catalyst consisting of $Fe(OH)_2$, $Cu(OH)_2$, $Ni(OH)_3$, and S (mol ratio of Fe:Cu:Ni:S being 20:0.5:0.5:21), and the mixture is kneaded to form a paste. Then, the reaction is effected in hydrogen atmosphere at reaction temperature of 370° to 380° C. under reaction pressure of 200 to 210 atm. for 120 min., with the liquefaction ratio of 83%. From the liquefied product, 6 parts of acetone and methanol, 20 parts of monophenols (such as o-cresol, p-cresol, 4-ethylphenol, etc.) and catechols (such as pyrocatechol, 4-methylcatechol, 4-ethylcatechol, etc.), 16 parts of a neutral oil, and 27 parts of a higher boiling oil (a fraction boiling at above 260° C.), are obtained.

*Example 31*

To 100 parts of lignin obtained from a sulfite pulp waste liquor as described in Example 4, are added 150 parts of a petroleum crude oil containing 20% of lignin tar (a fraction boiling at above 260° C.) and 10 parts of a mixed catalyst consisting of FeS, NiS, and SnS (mol ratio of Fe:Ni:Sn being 20:0.5:0.5), and the mixture is kneaded to form a paste. Then, the reaction is effected in hydrogen atmosphere at reaction temperature of 370° to 380° C. under reaction pressure of 200 to 210 atm. for 90 min., with the liquefaction ratio of 81.0%. From the liquefied product, 7.2 parts of acetone and methanol, 27 parts of monophenols (such as o-cresol, p-cresol, 4-ethylphenol, etc.) and catechols (such as pyrocatechol, methylcatechol, etc.), 8 parts of a neutral oil, and 25 parts of a higher boiling oil (a fraction boiling at above 260° C.), are obtained.

*Example 32*

One hundred parts of bark lignin (calculated as pure lignin) is admixed with 200 parts of lignin tar (a fraction boiling at above 260° C.) and 7 parts of a mixed catalyst consisting of $Fe(OH)_2$, $Sn(OH)_2$, $Ni(OH)_2$ and S (mol ratio of Fe:Sn:Ni:S being 20:0.5:0.5:21). The mixture is kneaded to form a paste, and charged in an autoclave. The reaction is effected at hydrogen pressure of 60 atm. and at reaction temperature of 360° to 370° C. under reaction pressure of 208 atm. for reaction period of 2 hours, with the liquefaction ratio reaching being 81.0%. The liquefied product is comprised of 8.2 parts of a fraction boiling at below 100° C. (containing acetone, methanol, etc.), 26 parts of a fraction boiling at 190° to 230° C. the monophenol fraction, containing o-cresol, p-cresol, o-ethylphenol, p-ethylphenol, n-propylphenol, etc. and a fraction boiling at 230° to 260° C. (the catechol fraction, containing pyrocatechol, etc.), and 12 parts of a fraction boiling at above 260° C., based upon 100 parts of lignin.

*Example 33*

To 100 parts of lignin obtained from a sulfite pulp waste liquor as described in Example 4, are added 150 parts of a petroleum crude oil containing 20% of lignin tar (a fraction boiling at above 260° C.) and 7 parts of a mixed catalyst consisting of FeS and CrS (mol ratio of Fe:Cr being 20:1), and the mixture is kneaded to form a paste. Then, the reaction is effected in hydrogen atmosphere at reaction temperature of 370° to 380° C. under reaction pressure of 210 atm. for 90 min., with the liquefaction ratio of 82.8%. From the liquefied product, 7.1 parts of acetone and methanol, 23 parts of monophenols (such as o-cresol, p-cresol, ethylphenol, etc.) and catechols (such as pyrocatechol, methylcatechol, ethylcatechol, etc.) 12 parts of a neutral oil, and 28 parts of a higher boiling oil (a fraction boiling at above 260° C.), are obtained.

*Example 34*

To 100 parts of lignin obtained from a sulfite pulp waste liquor as described in Example 4, are added 150 parts of lignin tar (a fraction boiling at above 260° C.) and 7 parts of a mixed catalyst consisting of $Fe(OH)_3$, $Cr(OH)_2$ and S (mol ratio of Fe:Cr:S being 20:1:21), and the mixture is kneaded to form a paste. Then, the reaction is effected in hydrogen atmosphere at reaction temperature of 380°±5° C. under reaction pressure of 200 to 210 atm. for 120 min., with the liquefaction ratio of 85.0%. From the liquefied product, 7.5 parts of acetone and methanol, 23 parts of monophenols (such as o-cresol, p-cresol, ethylphenol, etc.) and catechols (such as pyrocatechol, methylcatechol, ethylcatechol, etc.), 8 parts of a neutral oil, and 23 parts of a higher boiling oil (a fraction boiling at above 260° C.), are obtained.

*Example 35*

One hundred parts of bark lignin (calculated as pure lignin) is admixed with 200 parts of a petroleum crude oil, containing 20% of lignin tar (a fraction boiling at above 260° C.) and 7 parts of a mixed catalyst consisting of $Fe_2O_3$, $Cr(OH)_3$ and S (mol ratio of Fe:Cr:S being 20:1:21). The mixture is kneaded to form a paste, and charged in an autoclave. The reaction is effected at hydrogen pressure of 60 atm. and at reaction temperature of 360° to 370° C. under reaction pressure of 200 atm.

for reaction period of 2 hours, with the liquefaction ratio reaching 79.3%. The liquefied product is comprised of 7.3 parts of a fraction boiling at below 100° C. (containing acetone, methanol, etc.), 21 parts of a fraction boiling at 190° to 230° C. (the monophenol fraction, containing o-cresol, p-cresol, o-ethylphenol, p-ethylphenol, n-propylphenyl, etc.) and a fraction boiling at 230° to 260° C. (the catechol fraction, containing pyrocatechol, etc.), and 18 parts of a fraction boiling at above 260° C., based upon 100 parts of lignin.

*Example 36*

One hundred parts of lignin obtained from sulfite pulp waste liquor as described in Example 4 is admixed with 200 parts of lignin tar (a fraction boiling at above 260° C.) and 7 parts of a mixed catalyst consisting of Fe, Cr and S (mol ratio of Fe:Cr:S being 20:1:21). The mixture is kneaded to form a paste, and charged in an autoclave. The reaction is effected at hydrogen pressure of 60 atm. and at reaction temperature of 360° to 370° C. under reaction pressure of 200 atm. for reaction period of 2 hours, with the liquefaction ratio reaching 73.0%. The liquefied product is comprised of 5.3 parts of a fraction boiling at below 100 C. (containing acetone, methanol, etc.), 18 parts of a fraction boiling at 190° to 230° C. (the monophenol fraction, containing o-cresol, p-cresol, o-ethylphenol, p-ethylphenol, n-propylphenol, etc.) and a fraction boiling at 230° to 260° C. (the catechol fraction, containing pyrocatechol, etc.), and 25 parts of a fraction boiling at above 260° C., based upon 100 parts of lignin.

*Example 37*

To 100 parts of lignin obtained from a sulfite pulp waste liquor as described in Example 4, are added 150 parts of a petroleum crude oil containing 20% of lignin tar (a fraction boiling at above 260° C.) and 7 parts of a mixed catalyst consisting of FeS and ZnS (mol ratio of Fe:Zn being 10:1), and the mixture is kneaded to form a paste. Then, the reaction is effected in hydrogen atmosphere at reaction temperature of 370° to 380° C. under reaction pressure of 210 atm. for 90 min., with the liquefaction ratio of 82.8%. From the liquefied product, 6.5 parts of acetone and methanol, 30 parts of monophenols (such as o-cresol, p-cresol, ethylphenol, etc.) and catechols (such as pyrocatechol, methylcatechol, ethylcatechol, etc.), 8 parts of a neutral oil, and 25 parts of a higher boiling oil (a fraction boiling at above 260° C.), are obtained.

*Example 38*

To 100 parts of lignin obtained from a sulfite pulp waste liquor as described in Example 4, are added 150 parts of lignin tar (a fraction boiling at above 260° C.) and 7 parts of a mixed catalyst consisting of $Fe(OH)_2$, $Zn(OH)_2$ and S (mol ratio of Fe:Zn:S being 20:1:21), and the mixture is kneaded to form a paste. Then, the reaction is effected in hydrogen atmosphere at reaction temperature of 380°±5° C. under reaction pressure of 200 to 210 atm. for 120 min., with the liquefaction ratio of 85.0%. From the liquefied product, 8.0 parts of acetone and methanol, 33 parts of monophenols (such as o-cresol, p-cresol, ethylphenol, etc.) and catechols (such as pyrocatechol, methylcatechol, ethylcatechol, etc.), 5 parts of a neutral oil, and 20 parts of a higher boiling oil (a fraction boiling at above 260° C.), are obtained.

*Example 39*

To 100 parts of lignin obtained as the residue in wood saccharification with hydrogen chloride gas as described in Example 1, are added 150 parts of lignin tar (a fraction boiling at above 260° C.) and 10 parts of a mixed catalyst consisting of $Fe(OH)_2$, $Cr(OH)_2$, $Cu(OH)_2$ and S (mol ratio of Fe:Cr:Cu:S being 20:0.5:0.5:21), and the mixture is kneaded to form a paste. Then, the reaction is effected in hydrogen atmosphere at reaction temperature of 370° to 380° C. under reaction pressure of 200 to 210 atm. for 120 min., with the liquefaction ratio of 86%. From the liquefied product, 8 parts of acetone and methanol, 15 parts of monophenols (such as o-cresol, p-cresol, 4-ethylphenol, etc.) and catechols (such as pyrocatechol, 4-methylcatechol, 4-ethylcatechol, etc.), 17 parts of a neutral oil, and 31 parts of a higher boiling oil (a fraction boiling at above 260° C.), are obtained.

*Example 40*

To 100 parts of lignin obtained from a sulfite pulp waste liquor as described in Example 4, are added 150 parts of lignin tar (a fraction boiling at above 260° C.) and 5 parts of a mixed catalyst consisting of FeS, chromsulfide ($Cr_2S_3$) and $SnS_2$ (mol ratio of Fe:Cr:Sn being 20:0.5:0.5), and the mixture is kneaded to form a paste. Then, the reaction is effected in hydrogen atmosphere at reaction temperature of 370° to 380° C. under reaction pressure of 200 to 210 atm. for 120 min., with the liquefaction ratio of 89%. From the liquefied product, 8 parts of acetone and methanol, 28 parts of monophenol, (such as o-cresol, p-cresol, 4-ethylphenol, etc.) and catechols (such as pyrocatechol, etc.), 8 parts of a neutral oil, and 25 parts of a higher boiling oil (a fraction boiling at above 260° C.) are obtained.

*Example 41*

To 100 parts of lignin obtained from a sulfite pulp waste liquor as described in Example 4, are added 150 parts of lignin tar (a fraction boiling at above 260° C.) and 5 parts of a mixed catalyst consisting of FeS and CoS (mol ratio of Fe:Co being 20:1), and the mixture is kneaded to form a paste. Then, the reaction is effected in hydrogen atmosphere at reaction temperature of 370° to 380° C. under reaction pressure of 200 to 210 atm. for 120 min., with the liquefaction ratio of 86%. From the liquefied product, 6.5 parts of acetone and methanol, 23 parts of monophenols (such as o-cresol, p-cresol, 4-ethylphenol, etc.) and catechols (such as pyrocatechol, 4-methylcatechol, 4-ethylcatechol, etc.), 14 parts of a neutral oil, and 29 parts of a higher boiling oil (a fraction boiling at above 260° C.), are obtained.

*Example 42*

To 100 parts of thiolignin obtained from kraft pulp waste liquor as described in Example 5, are added 150 parts of lignin tar (a fraction boiling at above 260° C.) and 5 parts of a mixed catalyst consisting of FeS and $MoS_2$ (mol ratio of Fe:Mo being 20:1), and the mixture is kneaded to form a paste. Then, the reaction is effected in hydrogen atmosphere at reaction temperature of 360° to 370° C. under reaction pressure of 200 to 210 atm. for 120 min., with the liquefaction ratio of 87%. From the liquefied product, 8.2 parts of acetone and methanol, 28 parts of monophenols (such as o-cresol, p-cresol, 4-ethylphenol, etc.) and catechols (such as pyrocatechol, 4-methylcatechol, 4-ethylcatechol, etc.), 15 parts of a neutral oil, and 26 parts of a higher boiling oil (a fraction boiling at above 260° C.), are obtained.

*Example 43*

Into a vessel 1 for mixing the starting materials, are charged 200 parts of lignin obtained as the residue in wood saccharification with hydrogen chloride gas as described in Example 1, 250 parts of lignin tar, and 5 parts of a catalyst (a mixture of iron sulfide and copper sulfide in mol ratio of 10:1), and the mixture is stirred to form a paste, which is, then, passed to a pre-heater 11 at a rate of 3 liter/hr. by means of a paste-pump 2, is pre-heated at 250° C. in the pre-heater 11, and, thereafter, is fed at the bottom part of a reaction tower 3.

While, hydrogen, which is compressed at 250° C. by means of a compressor 17, is pre-heated at about 350° C. in a pre-heater 12, and, then, is introduced into the reaction tower 3 at the bottom part of the tower via a hydrogen blowing tube 18.

In the reaction tower 3, the paste and the hydrogen are kept at 320° to 330° C., thereby the reaction being completed while they move from the bottom part to the top. The liquefied substance in the reaction product, along with the catalyst, is flown out of the tower 3 through an over-flow pipe 19, and is collected via a cooler 7. While, the gaseous substance in the product, along with hydrogen gas, is flown out of the top of the tower 3, and is passed into a mist-catcher 4, where the liquid product accompanied with the gas is collected. The gas is passed in a higher-temperature separator 5 through a cooler 10.

In the higher-temperature separator 5, volatile materials in the gas are condensed, and the condensate is collected in a receiver 15 via a cooler 9. The non-condensed gas is passed from the higher-temperature separator 5 to a recycling booster 16, then, combined with a compressed hydrogen, and passed to the pre-heater 12 for recycling.

A cooler 6 and a receiver 13 are provided in order to be used for discharge of liquid in the reaction tower 3 when the liquefaction run is stopped.

The reaction product collected in the receiver 14 is distilled. A fraction boiling at above 260° C. is used as lignin tar for recycling, while, a fraction boiling at below 260° C. is further fractionated to yield 6 parts of a fraction boiling at below 100° C. (acetone and methanol), 47 parts of a fraction boiling at below 230° C. (monophenols), 4.0 parts of a fraction boiling at 230° to 260° C. (catechols), and 17 parts of a higher boiling oil.

The monophenols is composed of 7 parts of o-cresol, 20.4 parts of p-cresol, 15.6 parts of 4-ethylphenol, and 4.0 parts of 4-propylphenol.

The catechol fraction is mainly composed of pyrocatechol, and contains, besides, methylcatechol and 4-ethylcatechol.

What we claim is:
1. A method for liquefying lignin, comprising admixing lignin, as the raw material, with 50% to 200%, based upon the lignin material, of a solvent therefor; adding thereto 0.5 to 30% of at least one catalyst selected from the group consisting of mixtures of iron oxide, tin oxide, copper oxide and sulfur; iron hydroxide, tin hydroxide, copper hydroxide and sulfur; iron, tin, copper and sulfur, (mole ratio of Fe:Cu:Sn:S being 10:0.5–1: 0.5–1:11–12); keeping the mixture at the reaction condition of 300° to 400° C. and 150 to 450 atm. under hydrogen gas atmosphere until the lignin is liquefied; and separating the resulting liquefied product.

2. A method for liquefying lignin, comprising admixing lignin, as the raw material, with 50% to 200%, based upon the lignin material, of a solvent therefor; adding thereto 0.5 to 30% of a mixed catalyst consisting of at least one catalyst selected from the group consisting of iron oxide, tin oxide and sulfur; iron hydroxide, tin hydroxide and sulfur; and iron, tin and sulfur; and, as the co-catalyst, a mixture of at least one member of the group consisting of chromium, copper, molybdenum, nickel, cobalt, zinc, oxides and hydroxides of such metals, with sulfur (mole ratio of Fe:Sn:Metal:S being 10:0.5–1:0.5–1:11–12), keeping the mixture at the reaction condition of 300° to 400° C. and 150 to 450 atm. under hydrogen gas atmosphere until the lignin is liquefied; and separating the resulting liquefied product.

3. A method of liquefying lignin comprising admixing lignin as the raw material with a solvent therefor, adding thereto an iron-copper-tin-sulfur catalyst and co-catalyst mixture wherein the iron is the main catalyst metal and the copper and tin are the co-catalyst metals; the iron being in the form selected from the group consisting of metallic iron, a non-sulfur containing iron compound which in the presence of sulfur will produce iron sulfide in said liquefaction method, iron sulfide, and mixtures thereof; the copper being in the form selected from the group consisting of metallic copper, a non-sulfur containing copper compound which in the presence of sulfur will produce copper sulfide in said liquefaction method, copper sulfide, and mixtures thereof; the tin being in the form selected from the group consisting of metallic tin, a non-sulfur containing tin compound which in the presence of sulfur will produce tin sulfide in said liquefaction method, tin sulfide, and mixtures thereof; and the sulfur being in the form selected from the group consisting of free sulfur, sulfides of any of the above mentioned metals, and mixtures thereof; the iron catalyst constituting the major amount of said mixture and the copper and tin co-catalyst the minor amount; effecting such liquefaction at an elevated temperature and under superatmospheric pressure; and separating the resultant liquefied product.

4. The method of claim 3 wherein the sulfur in the catalyst and co-catalyst mixture is in the form of free sulfur; the iron is in the form selected from the group consisting of metallic iron, iron oxide and iron hydroxide; the copper is in the form selected from the group consisting of metallic copper, copper oxide and copper hydroxide; and the tin is in the form selected from the group consisting of metallic tin, tin oxide and tin hydroxide.

5. The method of claim 4 wherein the catalyst and co-catalyst mixture consists essentially of a paste of metallic iron, metallic copper, metallic tin, and free sulfur.

References Cited by the Examiner

UNITED STATES PATENTS 2,246,481  6/1941  Adkins et al. _____ 260—124.2
2,390,063  12/1945  Freudenberg et al. __ 260—124.2

FOREIGN PATENTS 69,897  11/1928  Sweden.

OTHER REFERENCES

Brauns: Chemistry of Lignin, page 524 (1952) Academic Press, Inc., New York, N.Y.

Hicks et al.: Chemical Abstracts 45, 4445 (1951).

CHARLES B. PARKER, *Primary Examiner.*

DANIEL D. HORWITZ, *Examiner.*